US006641621B2

(12) United States Patent
Viaene et al.

(10) Patent No.: US 6,641,621 B2
(45) Date of Patent: Nov. 4, 2003

(54) METHOD OF PREPARING CO-PRECIPITATED MICROCRYSTALLINE DYE DISPERSIONS AND LAYERS COATED THEREWITH IN MATERIALS

(75) Inventors: Kris Viaene, Bonheiden (BE); Jan Gilleir, Mortsel (BE); Geert De Roover, Lier (BE)

(73) Assignee: Agfa-Gevaert, Mortsel (BE)

( * ) Notice: Subject to any disclaimer, the term of this patent is extended or adjusted under 35 U.S.C. 154(b) by 0 days.

(21) Appl. No.: 10/090,294

(22) Filed: Mar. 4, 2002

(65) Prior Publication Data

US 2002/0160323 A1 Oct. 31, 2002

Related U.S. Application Data

(60) Provisional application No. 60/293,266, filed on May 23, 2001.

(30) Foreign Application Priority Data

Mar. 29, 2001 (EP) ........................................... 01000093

(51) Int. Cl.[7] ............................ C09B 67/22; G03C 1/83
(52) U.S. Cl. ................................ 8/638; 8/506; 430/522
(58) Field of Search ...................... 8/506, 638; 430/522

(56) References Cited

FOREIGN PATENT DOCUMENTS

| | | | |
|---|---|---|---|
| EP | 724191 | * | 7/1996 |
| EP | 0 724 191 A1 | | 7/1996 |
| EP | 0 756 201 A1 | | 7/1996 |

OTHER PUBLICATIONS

European Search Report EP01000093, Nov. 12, 2001.

* cited by examiner

*Primary Examiner*—Margaret Einsmann
(74) *Attorney, Agent, or Firm*—Joseph T. Guy; Nexsen Pruet Jacobs & Pollard, LLC

(57) ABSTRACT

A method has been disclosed for preparing a co-precipitated microcrystalline dye dispersion, the absorption spectrum of which exceeds the summoned spectra of individually dispersed dyes, which comprises, as consecutive preparation steps: adding to one vessel, an amount of at least one pentamethine oxonol-type barbituric acid filter dye having ionizable sites in its molecular structure; adding thereto an aqueous alkaline solution in an amount sufficient to completely dissolve the said filter dye while stirring the solution thus formed; adding in another vessel, to an amount of at least one pyrrole type filter dye, an amount of water, followed by adding of an aqueous alkaline solution and a surfactant; followed, after having completely dissolved (under stirring conditions) the said pyrrole type filter dye, by adding to the solution thus formed in the other vessel, the solution formed in the one vessel; adding an aqueous acidic solution up to a pH of less than 3.0; adding an aqueous alkaline solution up to a pH in the range from 4.0 up to 5.5; followed by adding a binder in order to make the dispersion thus obtained ready-for-coating in a filter dye layer on a support, suitable for use as antihalation undercoat layer between said support and a light-sensitive layer or as a backing layer of said material, or as layer covering the light-sensitive layer, thus providing safelight protection.

7 Claims, 6 Drawing Sheets

METHOD OF PREPARING CO-PRECIPITATED MICROCRYSTALLINE DYE DISPERSIONS AND LAYERS COATED THEREWITH IN MATERIALS

This application claims the benefit of Provisional Application No. 60/293,266, filed May 23, 2001.

FIELD OF THE INVENTION

The present invention generally relates to the field of preparation methods of dye dispersions and to elements, more particularly in the field of silver halide photography, comprising said dye dispersions in an antihalation or safelight protection layer.

BACKGROUND OF THE INVENTION

The photographic industry has since quite a long time recognized the need to provide photographic elements with some form of antihalation protection. Halation has been a persistent problem occurring with photographic films comprising one or more photosensitive silver halide layer(s) coated on a transparent support. The emulsion layer diffusely transmits light which then reflects back into the emulsion layer from the support surface. The silver halide emulsion is thereby re-exposed at locations differing from the original light path through the emulsion, which results in "halo-ring" formation on the film surrounding images of bright objects.

Another problem more particularly encountered e.g. with motion picture print films is exposure of silver halide light-sensitive layers by safelights along the support through "light-piping". Commonly used safelight in motion picture industry emits radiation in the range of 560–630 nm, and therefore e.g. a Kodak Safelight Filter No.8 is useful. This means that in particular for the red sensitive layer of the motion picture print film a safelight protection is required.

In order to provide antihalation protection in photographic films one method makes use therefor of a dyed or pigmented layer behind a clear support as an antihalation backing layer, wherein the said backing layer is designed to be removed during processing of the film. Typical examples of such antihalation backing layers comprise a light absorbing dye or pigment (such as carbon black) dispersed in an alkali-soluble polymeric binder (such as cellulose acetate hexahydrophthalate) which makes the layers be removable by an alkaline photographic processing solution. Such carbon containing "rem-jet" backing layers have been commonly used for antihalation protection in motion picture films. Moreover such a backing layer provides in a very efficient safelight protection of the light sensitive layers.

While such "rem-jet" backing layer provides effective antihalaton and safelight protection for photographic films prior to processing, use of it requires special additional processing steps in order to provide subsequent complete removal as incomplete removal of carbon particles may cause image defects in the resulting exposed print film when viewing on a screen during projection.

Accordingly an alternative layer arrangement or layer built-up for backing layers of elements containing carbon particles as pigments providing antihalation/safelight protection, said layers being removable in the processing of the said elements, is highly desirable.

One such alternative makes use of antihalation undercoat layers containing filter dyes coated between the support and the light-sensitive emulsion layers wherein the said filter dyes are solubilized and removed and/or decolorized during the processing of the film as has e.g. been illustrated in EP-A's 0 252 550 and 0 582 000, as well as in EP-A's 0 456 163, 0 587 229, 0 587 230, 0 656 401, 0 724 191, 0 786 497 and 0 781 816 and in U.S. Pat. Nos. 4,394,441; 4,900,652; 4,994,355; 5,223,382; 5,278,037; 5,232,825; 5,326,686; 5,346,810; 5,460,916; 5,462,832; 5,491,058; 5,700,630; 5,709,983; 5,723,272; 5,744,292; 5,928,849; 5,786,134; 5,866,309; 5,952,163 and 6,027,866. Dyes may be incorporated in layers as sole selected dyes or in combinations of dyes in order to provide antihalation protection throughout the whole visible spectrum, as e.g. for black-and-white microfilms. More particularly protection over almost the whole visible wavelength spectrum (400–750 nm) is desired for motion picture print films since these materials are sensitive to radiation covering the said spectrum.

With respect to safelight protection, more particularly in the range from 560 to 630 nm, the extinction of the dyes should be high enough in order to provide an absorption density preventing the red-sensitive layer to be exposed by safelight through the support. Useful dye combinations therefor can be found more particularly in in EP-A's 0 656 401, 0 724 191, 0 756 201, 0 781 816 and 0 786 497.

In order to obtain efficient antihalation and safelight protection over the whole visible wavelength range combinations of different dyes should also provide extinctions which should be high enough in order to provide high enough an absorption density over the said range. This means that substantial amounts of dyes are required in the antihalation layers. Since it is very important to reduce the load (and thickness) of the layers from a point of view of manufacturing costs of the photographic element as well as from the point of view of decolorizing properties in the processing, more particularly in rapid processing cycles, it is of crucial importance to choose the most efficient combination of dyes and the best way possible in order to combine them before adding them to coating solutions for the designed layers wherein they are preferred.

OBJECTS OF THE INVENTION

It is an object of this invention to provide antihalation/safelight protection layers wherein dyes are present, selected and combined in such a way that low amounts of said dyes having excellent extinction properties and light-absorption properties over the desired wavelenght range become available in order to provide enough absorption density over the whole desired range, thus providing protection of the photosensitive layers and the material against safelight and reflection by the support.

SUMMARY OF THE INVENTION

In order to reach the objects of the present invention a method for preparing a co-precipitated microcrystalline dye dispersion has thus been obtained, the absorption spectrum of which exceeds the summoned spectra of the individually dispersed dyes, which comprises as consecutive steps

- adding to one (a first) vessel, an amount of at least one pentamethine oxonol-type barbituric acid filter dye having ionizable sites in its molecular structure;
- adding thereto an aqueous alkaline solution in an amount sufficient to completely dissolve the said filter dye while stirring the solution thus formed;
- adding in another vessel, to an amount of at least one pyrrole type dye, an amount of water, followed by addition of an aqueous alkaline solution and a surfactant and, after having completely dissolved the said pyrrole type dye, adding, while further stirring, to the solution of the pyrrole type dye(s), the solution of the pentamethine oxonol-type barbituric acid dye(s);

adding an aqueous acidic solution up to a pH of less than 3.0;

adding an aqueous alkaline solution up to a pH in the range from 4.0 up to 5.5; and adding a binder.

According to the present invention incorporation of the thus obtained co-dispersion(s) in dye antihalation or safelight protection layers of light-sensitive silver halide photographic elements or materials in order to provide particularly suitable antihalation characteristics or safelight protection as a backing layer of said material, or as layer covering the light-sensitive layer.

Figure 1:
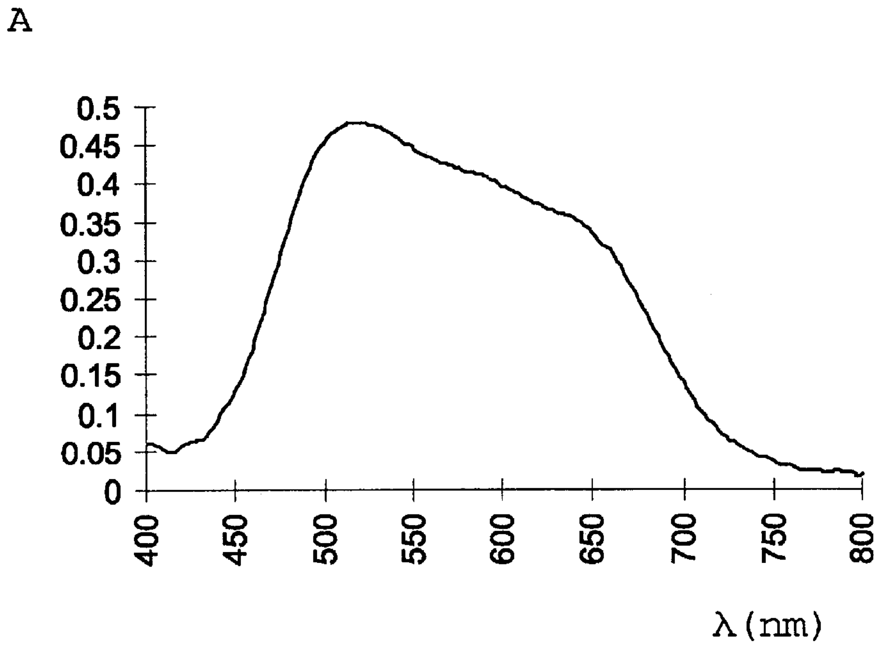
FIG. 1 shows the absorption spectrum measured for Dye I

Structures of the dyes I–VI have been given hereinafter in the Examples.

The absorption spectrum are showing differences in Absorption A at continuously differing wavelengths $\lambda$ (expressed in nm) in the range from 400–800 nm.

All spectra have been measured with a Perkin-Elmer Lambda 900 apparatus.

DETAILED DESCRIPTION OF THE INVENTION

As a result of extensive investigations it has surprisingly been found that preparation of a co-precipitated microcrystalline dye dispersion of (at least) two dyes by the method as disclosed herein, unexpectedly provides quite different and clearly improved absorption properties of the dyes versus mixing of separately dispersed dyes. The exctinction coefficient after application of the "co-dispersing method" as claimed and as described in the description hereinafter is not only remarkably higher than that of the dyes, dispersed separately as sole dyes, but moreover the absorption of the co-dispersion shows a superadditive effect in that the absorption spectrum of the "co-dispersion" exceeds the summoned spectra of the individually dispersed dyes.

Specific features for preferred embodiments of the invention have been further set out in the dependent claims.

According to the present invention a method for preparing a co-precipitated microcrystalline dye dispersion of filter dyes has thus been described. Filter dyes dissolved in one vessel, further called the "first vessel" are those of the pentamethine oxonol-barbituric acid filter dye type, having ionizable sites in its molecular structure. An aqueous alkaline solution (preferably an aqueous solution of sodium or potassium hydroxide, thereby not excluding other alkaline hydroxides like e.g. (tetraalkyl)ammonium hydroxide or a mixtures thereof) should be added in an amount sufficient to completely dissolve the filter dye while stirring the solution thus formed. The method may proceed at room temperature, although higher temperatures are not excluded. In a second vessel wherein the effective co-precipitation reaction proceeds, an amount of at least one pyrrole type filter dye is added, followed by adding an amount of water and further addition of an aqueous alkaline solution (preferably an ammoniacal solution) and a surfactant under stirring conditions. In a preferred embodiment said surfactant, added as dispersing aid, has a sulphonic acid group in its structure, like e.g. tetradecane-1-sulfonic acid. Besides making use of surfactants as dispersing aid stabilizers, dispersants, polymeric colloids, or mixture of any of them are also suitable. Although organic solvents should preferably not be used in the method of the present invention, the dispersion thus leaving solvent-free, a mixture of an aqueous alkaline solution with a water-miscible organic solvent, if required for whatever a reason, may only exceptionally be used.

After having completely dissolved under stirring conditions the said pyrrole type filter dye, the dissolved dye prepared before in the first vessel is added, under further stirring conditions. Once completely mixed, an aqueous acidic solution is (dropwise) added up to a pH of less than 3.0; more preferably a pH between 1.0 and 3.0, and still more preferably between 1.5 and 2.5, thus most preferably at a pH of about 2.0. Controll of pH values is preferably performed by means of a pH indicator electrode. At such low pH values the coprecipitated dyes have a negligable solubility, especially after acidifying such a "solution of co-precipitated dyes" with up to a stoichiometric amount of protons providing an acidity in order to reprotonate up to 100% of the total ionizable acid sites on the filter dye molecules and in order to provide a microprecipitated dispersion of the filter dye that is about insoluble in aqueous media at those low pH values.

In a following step an aqueous alkaline solution is (dropwise) added in order to get a pH in the range from 4.0 up to 5.5. At those pH values the co-dispersion of dyes is soluble to an extent of less than 0.05 weight % at pH 5, and soluble in aqueous media at pH greater than 10, wherein a resulting dye stock solution of 0.1–50 wt % of co-dispersed dyes can be obtained.

After having been adjusted to a pH in the range from 4.0 up to 5.5 as set forth above, a binder is added to the co-dispersion of the dyes, wherein said binder is selected from the group of compounds consisting of gelatin, colloidal silicic acid, polyvinyl pyrrolidone and starch or a mixture thereof. Dropwise addition under stirring conditions always is in favor of a better homogenization of the mixture present in the reaction vessel.

In one embodiment in the method of the present invention, before coating, said dispersion is subjected to an ultrasonic treatment. Such an ultrasonic treatment is particularly useful in order to provide deagglomeration or, otherwise said, to avoid agglomeration of larger particles: particles have a mean diameter ranging from about 0.003 to about 1.000 $\mu$m, and, more preferably, from about 5 to about 100 nm, and still more preferably from 5 to 50 nm are envisaged.

In the method according to the present invention the said pyrrole type filter dye(s) is(are) represented by the general formula (I)

(I)

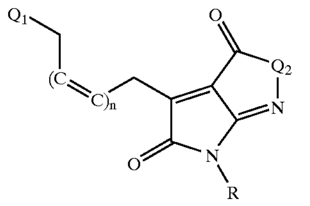

wherein n equals 0 or 1 wherein Q1 represents a phenyl ring or a thiophene ring; wherein Q2 represents a carbon, a nitrogen, a sulfur or an oxygen atom in order to provide a five-membered ring; a —N—C— or a —N—S— bond in order to provide a six-membered ring or a —N—C—C— chain in order to provide a seven-membered ring, wherein the said bond or chain representing Q2 is from C═O to N and wherein substituents present on the carbon atoms of the —N—C— bond representing Q2 or substituents on the carbon atoms of the —N—C—C— chain representing Q2 may close to form an unsaturated; and wherein R represents a member selected from the group consisting of a hydrogen atom, an alkyl, an alkenyl, an alkynyl, an aryl, a vinyl; C(═N—R1)—R2 CH═(N+) (—R3)2; CR 1═(N+) (—R2) 2; C═N+—O—; CO—H and the acetals and thioacetals derived therefrom; CO—NH—R3; CO—NH—SO2—R3 and the corresponding salts; CO—O—R3; C—R3 and the acetals, thioacetals, aminals and 1,3-oxathiolans derived therefrom; CO—S—R3; CS—H; CS—NH—R3; CS—O—R3; CS—R3; CS—S—R3; F, Cl, Br, I, CN; N═C═N—R3; N═C═O; N═C═S; N═N(O)—R3; N═N—R3; NH—CO—NH—R3; NH—CO—R3; NH—CS—NH—R3; NH—CS—R3; NH—R3; NH—SO2—R ; NO2; NR1—CO—R2; NR1—CS—R2; NR32; O—CN; O—CO—R3; O—R3; O—SO2—R3; P(OR3)2; PO—(OR3)2; S—CN; S—CO—R3; S—CS—R3; S—R3; SO—R3; SO2—NHR3 and the salts derived therefrom; SO2—R3; SO3H and the salts derived therefrom;

and wherein each of R1, R2 and R3 independently represents a member selected from the group consisting of a hydrogen atom, an alkyl, an alkenyl, an alkynyl, an aryl and a vinyl.

In the method according to the present invention, said pyrrole type filter dye is, in a more preferred embodiment, represented by the specific formula (II)

(II)

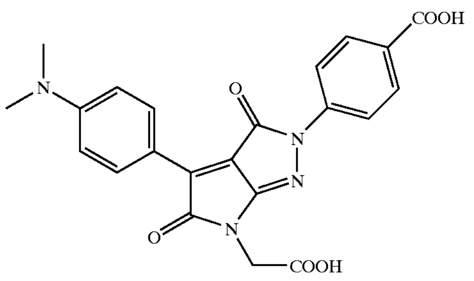

Otherwise according to the method of the present invention the said pentamethine oxonol barbituric acid type filter dye(s) is(are) represented by the general formula (III)

(III)

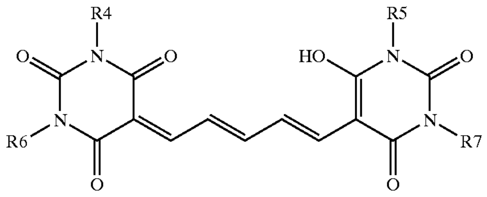

wherein each of R4 and R5, which may be the same or different, represents: hydrogen, C1—C4 alkyl, C1—C4 alkoxy, or substituted or unsubstituted aryl, and each of R6 and R7, which may be the same or different, represents: one of the groups represented by R4 and R5, or cycloalkyl.

In a more preferred embodiment according to the present invention said pentamethine oxonol barbituric acid type filter dye(s) is(are) represented by the specific formulae (IV.1–IV.5)

(IV.1)

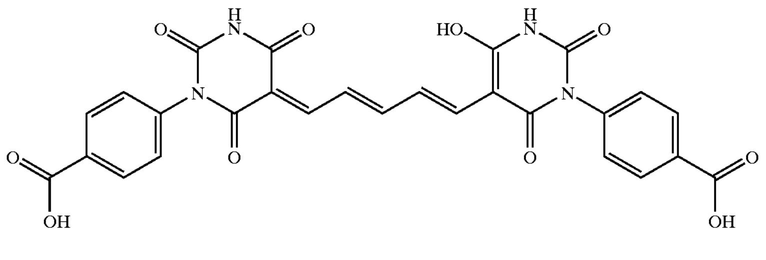

(IV.2)

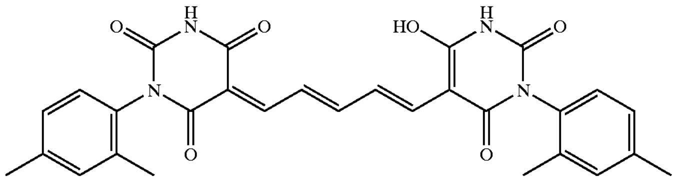

-continued (IV.3)

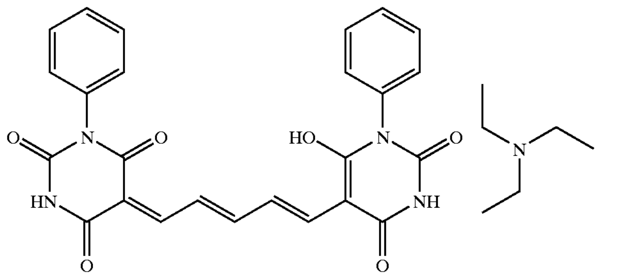

(IV.4)

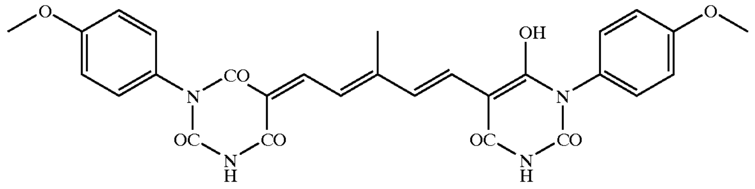

(IV.5)

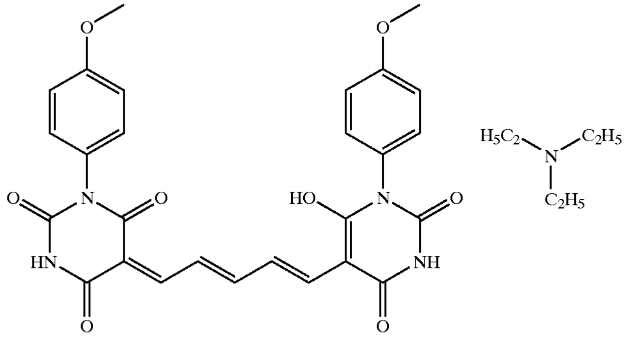

According to the method of the present invention the filpyrrol type dyes according to the general formula (I) and the pentamethine oxonol barbituric acid type dyes according to the formula (III) are present as co-dispersed dyes in preferred molar ratio amounts of from 1:1 up to 3:1, and in an even more preferred embodiment in a ratio amount of about 2:1.

According to the method of the present invention a co-dispersion of dyes as claimed is present in a concentrated form.

According to the present invention a co-dispersion prepared according to the method of the present invention is thus obtained, which, when coated on a support and measured with a Perkin-Elmer Lambda 900 apparatus, provides an absorption spectrum measured in the range from 450 to 750 nm with absorption ratios, defined as ratio of absorption values measured at at wavelengths of 500 nm and 650 nm, in the range of from 0.9 up to 1.1 for molar ratio amounts of from 1:1 up to 3:1 and, in an even more preferred embodiment, in a ratio amount of about 2:1, and wherein the absorption spectrum of which exceeds the summoned spectra of the individually dispersed dyes.

According to the method of the present invention a co-dispersion of the dyes is thus obtained, wherein average particle sizes of the co-dispersed dyes are in the range from 0.10–0.45 $\mu$m, with an average standard deviation in the range of from 0.10–0.15.

Analysis by X-ray diffraction techniques of the "co-dispersion" thus obtained unambiguously demonstrates that a remarkable change in crystal structure of the dye dispersion is observed when the method of the present invention is applied, if compared with dispersion methods for sole dyes, dispersed separately and mixed afterwards.

Increasing the temperature in the vessel containing the co-dispersed dyes up to coating temperature (about 40° C.) makes the dispersion thus obtained ready-for-coating in a filter dye layer on the support, suitable for use as antihalation undercoat layer between said support and a light-sensitive layer or as a backing layer of said material, or as layer covering the light-sensitive layer or layers, thus providing safelight protection. Amounts of co-dispersed dyes in the mentioned layers are in the range from 50 mg/$m^2$ up to 500 mg/$m^2$.

According to the present invention a material is further obtained, said material comprising a support and at least one layer having a co-dispersion as disclosed herein. More particularly in the present invention a light-sensitive silver halide photographic material is provided, said material having, besides at least one light-sensitive silver halide emulsion layer, one or more (dyed) non-light sensitive layers containing a co-dispersion as disclosed hereinbefore, and wherein said layer is selected from the group of layers consisting of an antihalation undercoat layer situated between support and light-sensitive layer, between light-sensitive layers, a backing layer and a (safelight) protective (outermost) layer (farther from the support than any light-sensitive layer coated onto the material support).

Further advantages and embodiments of the present invention will become apparent from the following examples and from the absorption curves related therewith.

EXAMPLES

While the present invention will hereinafter be described in connection with preferred embodiments thereof, it will be understood that it is not intended to limit the invention to those embodiments.

1. Procedure:

1.1 Dissolving Dyes (Dye Solutions II–VI)

Following solutions of dyes were prepared, all solutions having equimolar amounts of the respective dyes:

an amount of dye (expressed in g, as weight unit) was taken, depending on the amount of dye, expressed in weight %, that should be present in the dispersion;

1.875 g of a solution of sodium hydroxide solution (about 5%) and 2.375 g of demineralized water (at room temperature) were added thereto while stirring;

followed by further stirring, making use of an ultrasound apparatus, if required, until the dye was completely dissolved.

1.2. Mixed Dye Dispersions(from Dye I and Dye Solutions II–VI)

in a beaker the required amount of Dye I was weighed;

demineralized water (at room temperature) was added to the dye in an amount of 33.75 g;

an excessive amount of ammonia was added (0.8 g) and stirring was performed until the dye was dissolved, making use of an ultrasound apparatus, if necessary;

pH was measured (should have a value of about 9.0);

surfactant was added;

3.34 g of "Dye solution" was added (see 1.1) while pH increased to a value of about 9.5;

the solution in the beaker was agitated faster and pH was controlled by means of a pH-electrode in order to precipitate the dye mixture (solution) with concentrated sulfuric acid (about 15%) until pH was decreased up to value of about 2.1; and after five minutes of agitation the dispersion was brought to a pH value of about 4.8; whereafter gelatin was added;

the dispersion was matured for 30 minutes.

The dispersion was further heated to 40° C. and stirred for one hour; followed by dilution with water in order to get a total weight of 50 g of dispersion.

1 g of the said dispersion was diluted with a 5 wt % solution of gelatin in order to be ready for coating on a PET support.

Strips having an amount of dye of about 350 mg/m$^2$ were thus obtained and spectra were measured by means of a Perkin-Elmer Lambda 900 apparatus from the coated strips. Densities obtained as a function of wavelength in the range from 400 up to 800 nm were plotted.

2. Structures

Dye I

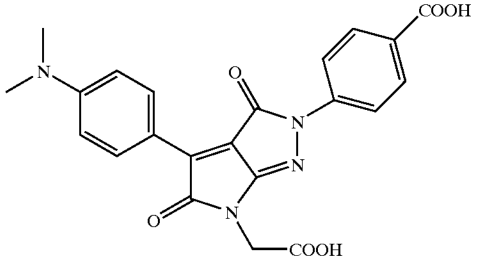

Spectrum: see FIG. 1

-continued

Dye II

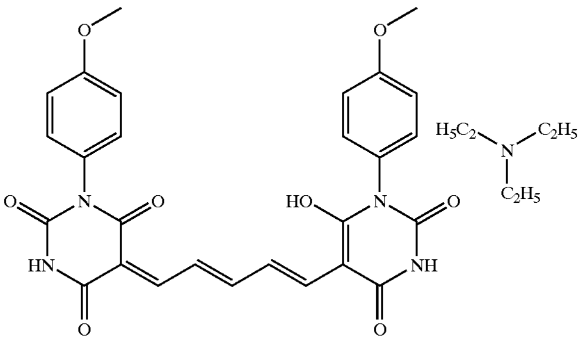

Figure 2:
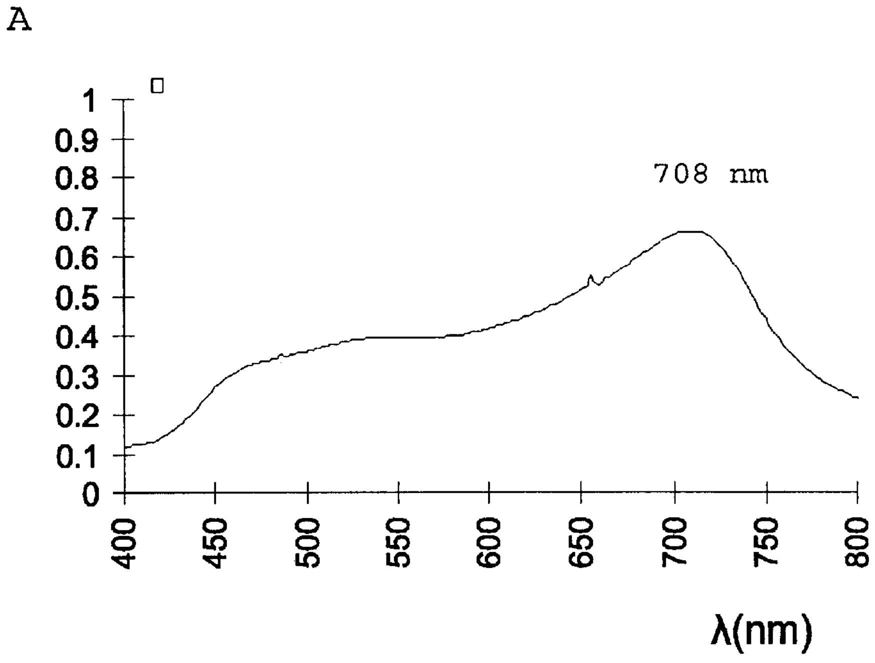
FIG. 2 shows the absorption spectrum measured for Dye II

Spectrum: see FIG. 2

Dye III

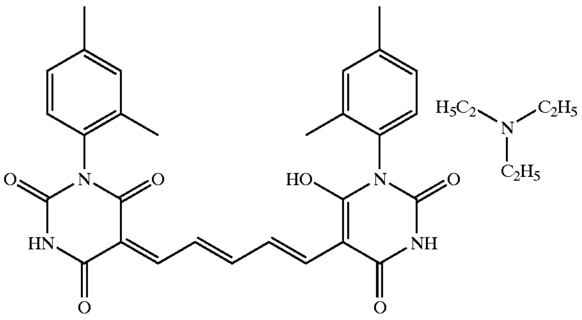

Figure 3:
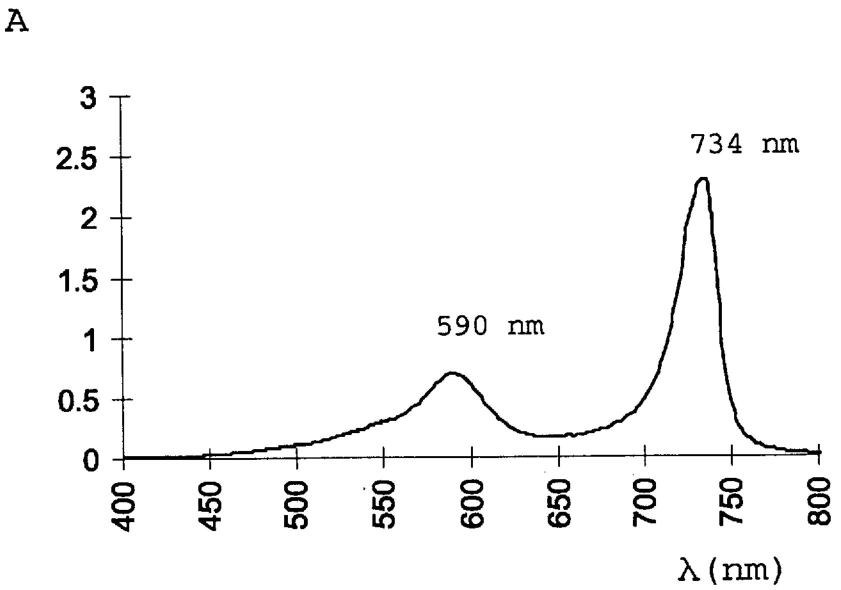
FIG. 3 shows the absorption spectrum measured for Dye III

Spectrum: see FIG. 3

Dye IV

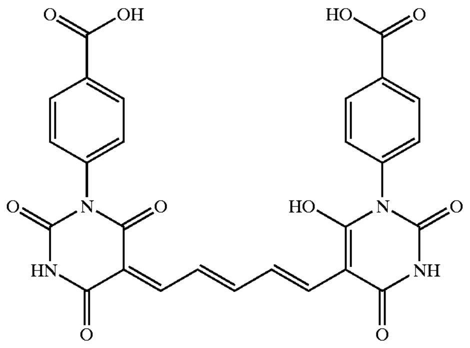

Figure 4:
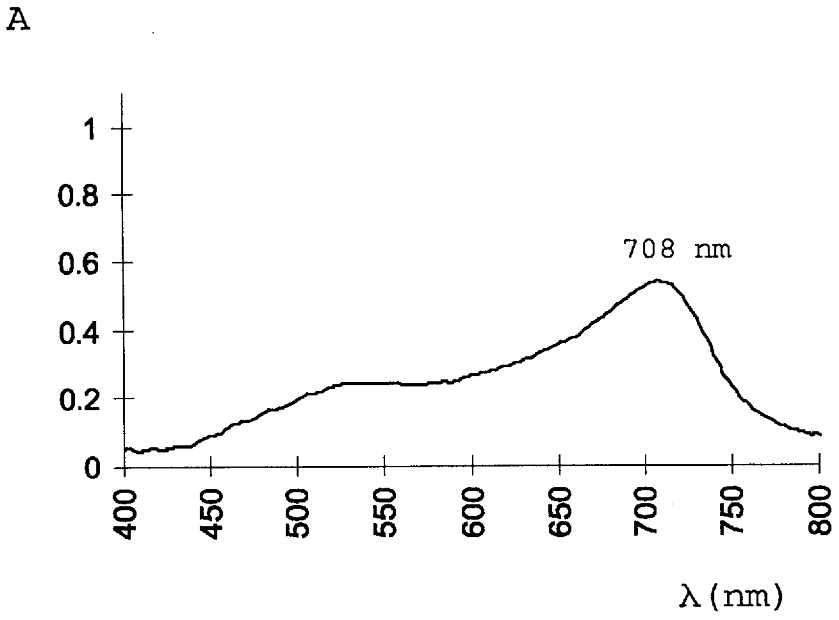
FIG. 4 shows the absorption spectrum measured for Dye IV

Spectrum: see FIG. 4

Dye V

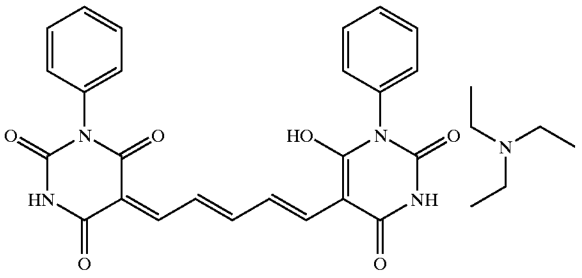

Figure 5:
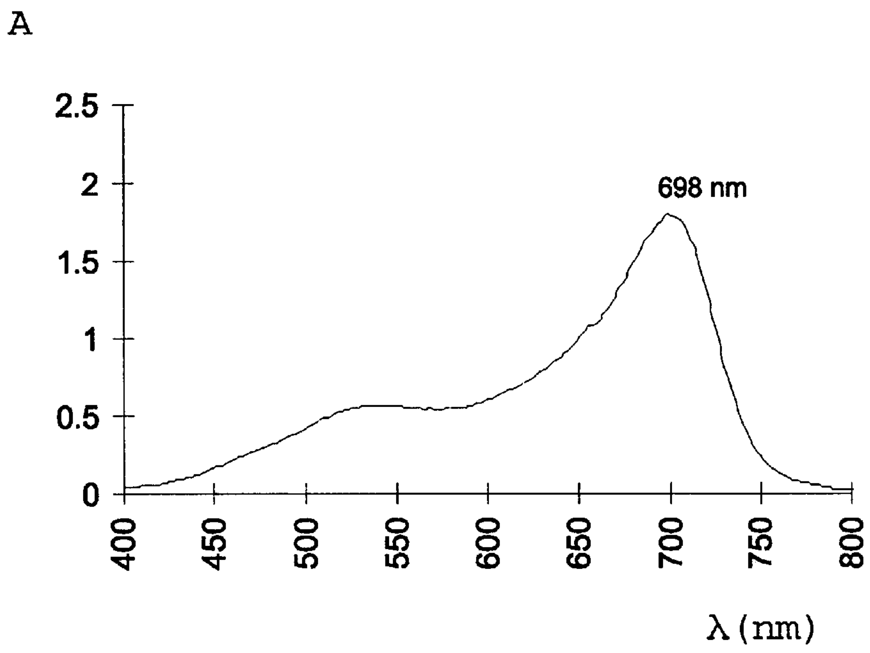
FIG. 5 shows the absorption spectrum measured for Dye V

Spectrum: see FIG. 5

-continued

Dye VI

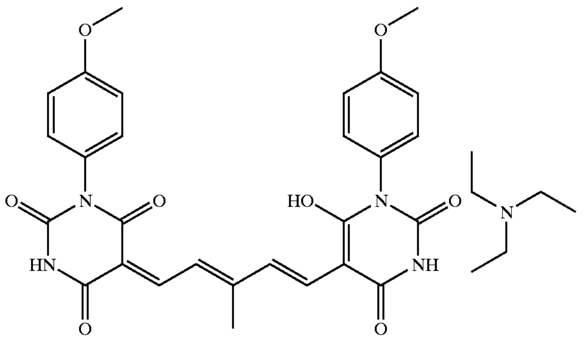

Figure 6:
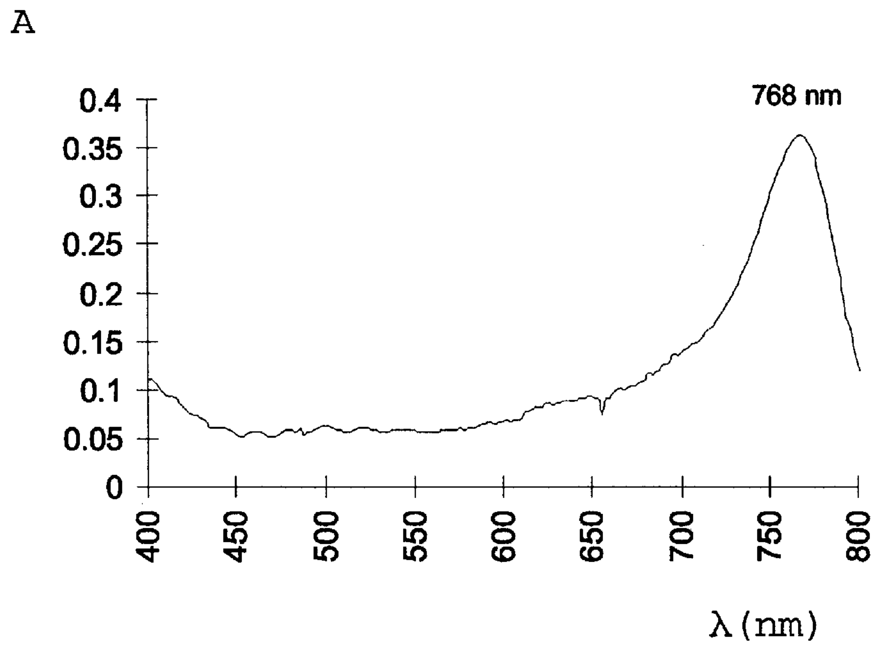
FIG. 6 shows the absorption spectrum measured for Dye VI
Figure 7:
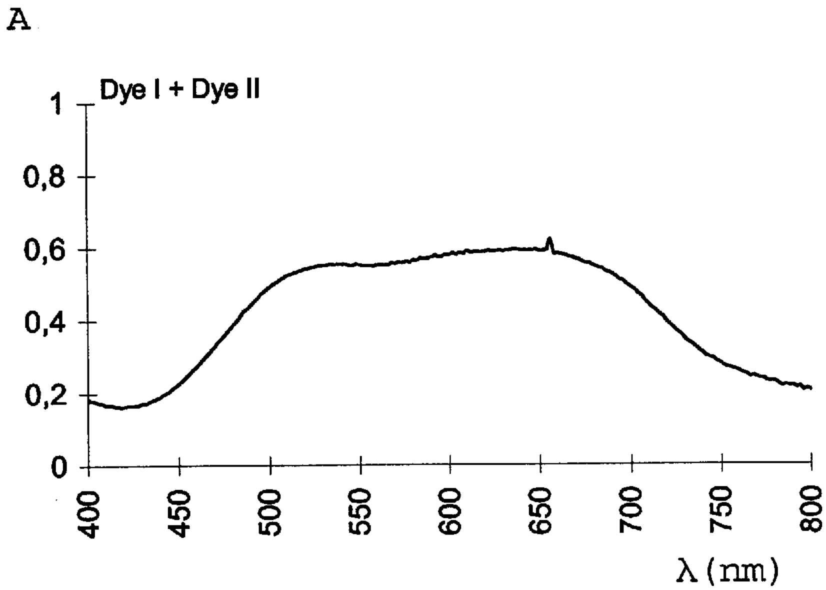
FIG. 7 shows the absorption spectrum measured for a co-dispersion of the dyes I and II.
Figure 8:
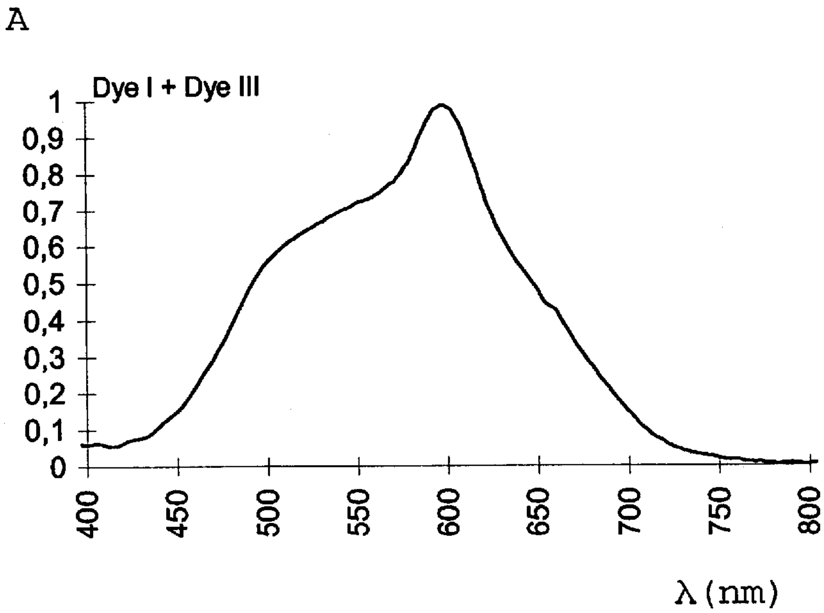
FIG. 8 shows the absorption spectrum measured for a co-dispersion of the dyes I and III.
Figure 9:
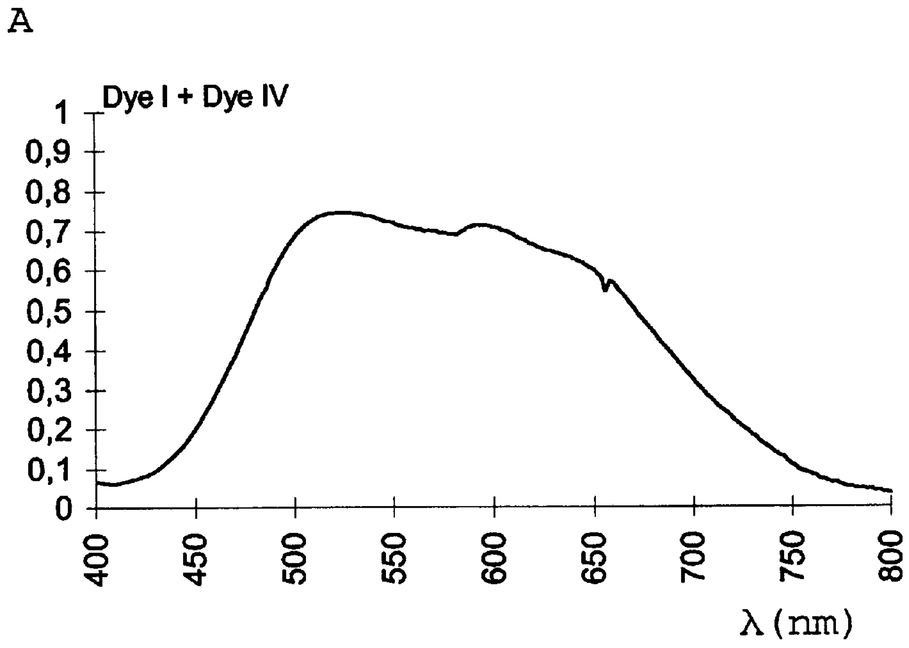
FIG. 9 shows the absorption spectrum measured for a co-dispersion of the dyes I and IV.
Figure 10:
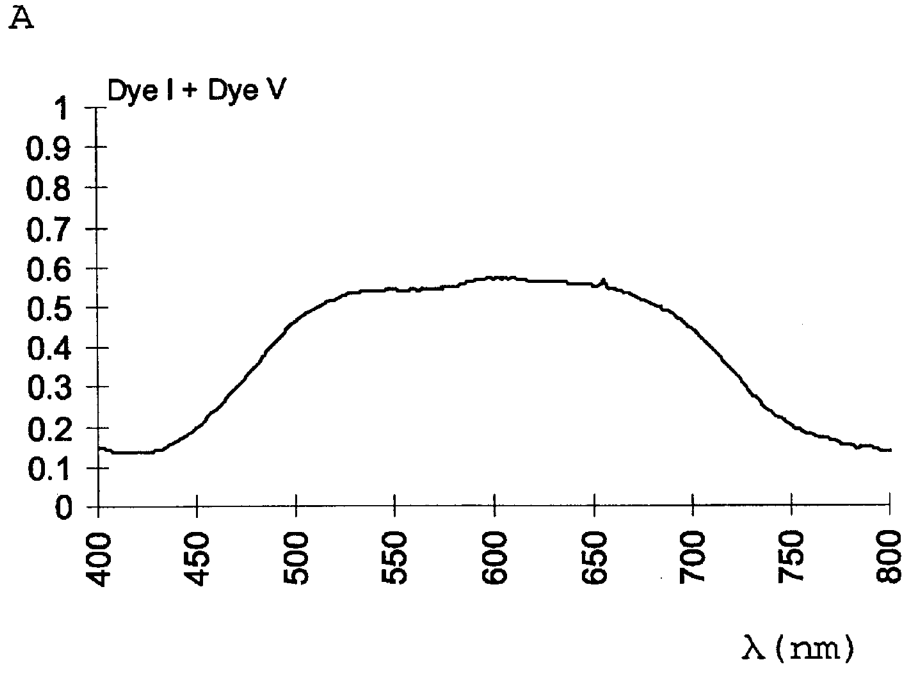
FIG. 10 shows the absorption spectrum measured for a co-dispersion of the dyes I and V.
Figure 11:
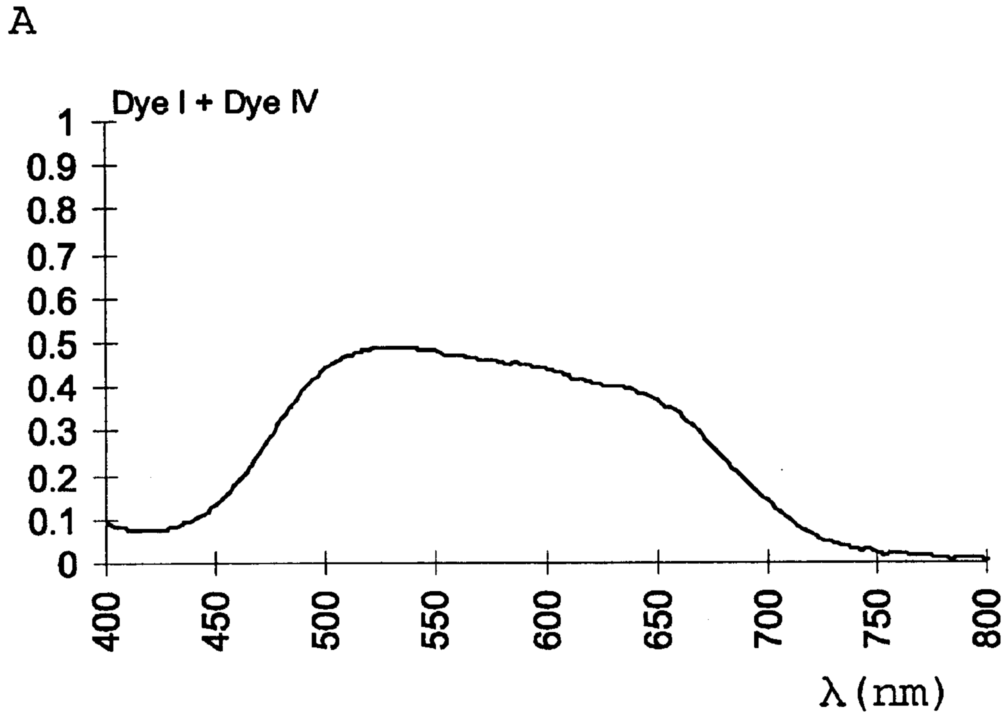
FIG. 11 shows the absorption spectrum measured for a co-dispersion of the dyes I and VI.

Spectrum: see FIG. 6

3. Results for Spectra of the Coated PET Layers. Dye I (wt %):Dye II–VI (wt %)=2:1

Spectra from the co-dispersions of dye I with the dyes II–VI have been given consecutively in the FIGS. 7–11 hereinafter.

From the spectra of the co-dispersions, coated on a PET support it can be concluded that, if compared with the spectra of the individual dyes (see spectra in part 2), an absorption spectrum more equally distributed over the wavelength range from 500 nm to 650 nm is obtained.

Having described in detail preferred embodiments of the current invention, it will now be apparent to those skilled in the art that numerous modifications can be made therein without departing from the scope of the invention as defined in the appending claims.

What we claim is:

1. Method for preparing a co-precipitated microcrystalline dispersion of dyes, the absorption spectrum of which exceeds the summoned spectra of individually dispersed dyes, which comprises, as consecutive preparation steps:

adding to one vessel, an amount of at least one pentamethine oxonol barbituric acid filter dye having ionizable sites in its molecular structure;

adding thereto an aqueous alkaline solution in an amount sufficient to completely dissolve the said filter dye while stirring the solution thus formed;

adding in another vessel, to an amount of at least one pyrrole dye, an amount of water, followed by addition of an aqueous alkaline solution and a surfactant and, after having completely dissolved the said pyrrole dye, adding, while further stirring, to the solution of the pyrrole dye(s), the solution of the pentamethine oxonol barbituric acid dye(s);

adding an aqueous acidic solution up to a pH of less than 3.0;

adding an aqueous alkaline solution up to a pH in the range from 4.0 up to 5.5; and adding a binder.

2. Method according to claim 1, further comprising subjecting the dispersion to an ultrasonic treatment.

3. Method according to claim 1, wherein said dispersion is coated in a hydrophilic layer on a coating support or substrate after dilution of said dispersion.

4. Method according to claim 1, wherein said binder is selected from the group of compounds consisting of gelatin, colloidal silicic acid, polyvinyl pyrrolidone and starch, and mixtures thereof.

5. Method according to claim 1, wherein said pyrrole dye(s) is(are) represented by general formula (I)

(I)

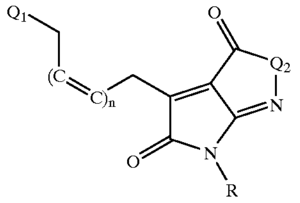

wherein n equals 0 or 1 wherein Q1 represents a phenyl ring or a thiophene ring; wherein Q2 represents a carbon, a nitrogen, a sulfur or an oxygen atom in order to provide a five-membered ring;

a —N—C— or a —N—S— bond in order to provide a six-membered ring or a —N—C—C— chain in order to provide a seven-membered ring, wherein the said bond or chain representing Q2 is from C═O to N and wherein substituents present on the carbon atoms of the —N—C— bond representing Q2 or substituents on the carbon atoms of the —N—C—C— chain representing Q2 may close to form an unsaturated ring; and wherein R represents a member selected from the group consisting of a hydrogen atom, an alkyl, an alkenyl, an alkynyl, an aryl, a vinyl; C(═N—R1)—R2 CH═(N+)(—R3)2;

CR 1=(N+) (—R2)2; C═N+ —O—; CO—H and the acetals and thioacetals derived therefrom;

CO—NH—R3; CO—NH—SO2—R3 and the corresponding salts;

CO—O—R3; CO—R3 and the acetals, thioacetals, aminals and 1,3-oxathiolans derived therefrom; CO—S—R3; CS—H; CS—NH—R3; CS—O—R3; CS—R3; CS—S—R3; F, Cl, Br, I, CN; N═C═N—R3; N═C═O; N═C═S; N═N(O)—R3; N═N—R3; NH—CO—NH—R3; NH—CO—R3; NH—CS—NH—R3; NH—CS—R3; NH—R3; NH—SO2—R ; NO2; NR1—CO—R2; NR1—CS—R2; NR32; O—CN; O—CO—R3; O—R3; O—SO2—R3; P(OR3)2; PO—(OR3)2; S—CN; S—CO—R3; S—CS—R3; S—R3; SO—R3; SO2—NHR3 and the salts derived therefrom; SO2—R3; SO3H and the salts derived therefrom; and wherein each of R1, R2 and R3 independently represents a member selected from the group consisting of a hydrogen atom, an alkyl, an alkenyl, an alkynyl, an aryl and a vinyl.

6. Method according to claim 1, wherein said pentamethine oxonol barbituric acid dye(s) is(are) represented by general formula (III)

(III)

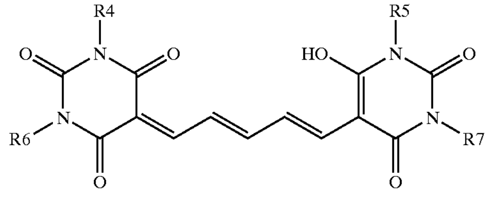

wherein each of R4 and R5, which may be the same or different, represents: hydrogen, C1–C4 alkyl, C1–C4 alkoxy, or substituted or unsubstituted aryl, and each of R6 and R7, which may be the same or different, represents: one of the groups represented by R4 and R5, or cycloalkyl.

7. Method according to claim 1, wherein the at least one pyrrol dye and the at least one pentamethine oxonol barbituric acid dye are in molar ratio amounts of from 1:1 up to 3:1.

* * * * *